(12) United States Patent
Cameron et al.

(10) Patent No.: US 11,881,024 B2
(45) Date of Patent: Jan. 23, 2024

(54) SYSTEM AND METHOD FOR UTILIZING HEAT MAPS FOR TRAFFIC AND COMPLIANCE REPORTING

(71) Applicant: Patriot One Technologies Inc., Toronto (CA)

(72) Inventors: James Allan Douglas Cameron, Fredericton (CA); Matthew Aaron Rogers Carle, Fredericton (CA); Jonathan Taylor Millar, Fredericton (CA)

(73) Assignee: Patriot One Technologies Inc.

( * ) Notice: Subject to any disclaimer, the term of this patent is extended or adjusted under 35 U.S.C. 154(b) by 0 days.

(21) Appl. No.: 17/652,943

(22) Filed: Mar. 1, 2022

(65) Prior Publication Data

US 2022/0189169 A1   Jun. 16, 2022

Related U.S. Application Data

(63) Continuation of application No. 17/548,494, filed on Dec. 11, 2021, and a continuation of application No. 17/330,971, filed on May 26, 2021.
(Continued)

(51) Int. Cl.
| | |
|---|---|
| *G06V 20/40* | (2022.01) |
| *G06V 40/10* | (2022.01) |
| *G06V 20/52* | (2022.01) |
| *G06T 7/73* | (2017.01) |
| *G08B 13/196* | (2006.01) |
| *H04N 23/611* | (2023.01) |
| *H04N 23/695* | (2023.01) |

(52) U.S. Cl.
CPC ............. *G06V 20/41* (2022.01); *G06T 7/73* (2017.01); *G06V 20/52* (2022.01); *G06V 20/53* (2022.01); *G06V 40/103* (2022.01); *G08B 13/19613* (2013.01); *G08B 13/19682* (2013.01); *G08B 13/19684* (2013.01); *G08B 13/19691* (2013.01); *H04N 23/611* (2023.01); *H04N 23/695* (2023.01)

(58) Field of Classification Search
None
See application file for complete search history.

(56) References Cited

U.S. PATENT DOCUMENTS 10,311,409 B1 *   6/2019   Brailovskiy .......... G06F 16/683
10,796,567 B1 *  10/2020   Tang ..................... G08G 1/207
(Continued)

OTHER PUBLICATIONS

Pu, J., Liu, S., Ding, Y., Qu, H. and Ni, L., Jun. 2013. T-watcher: A new visual analytic system for effective traffic surveillance. In 2013 IEEE 14th International Conference on Mobile Data Management (vol. 1, pp. 127-136). IEEE. (Year: 2013).*
(Continued)

*Primary Examiner* — Michelle M Entezari (57) ABSTRACT

A system and method for utilizing a multi-sensor video surveillance system for traffic and compliance reporting. Utilizing closed caption televisions (CCTVs), cameras and other sensors, the system can generate heat maps and monitor activity in the scene. Based on the heat maps and object detection, the system can monitor traffic pattern for vehicles and monitor people for personal protective equipment (PPE) compliance.

19 Claims, 8 Drawing Sheets

Related U.S. Application Data (60) Provisional application No. 63/154,836, filed on Mar. 1, 2021, provisional application No. 63/124,108, filed on Dec. 11, 2020.

(56) References Cited

U.S. PATENT DOCUMENTS

| | | | | |
|---|---|---|---|---|
| 2007/0127816 | A1* | 6/2007 | Balslev | G06T 7/12 |
| | | | | 382/181 |
| 2014/0002349 | A1* | 1/2014 | Hansen | G06T 7/246 |
| | | | | 345/156 |
| 2014/0132767 | A1* | 5/2014 | Sonnabend | G06V 20/63 |
| | | | | 348/148 |
| 2015/0227796 | A1* | 8/2015 | Holzschneider | G06T 11/60 |
| | | | | 382/103 |
| 2015/0304634 | A1* | 10/2015 | Karvounis | G06F 18/21355 |
| | | | | 348/46 |
| 2016/0379176 | A1* | 12/2016 | Brailovskiy | G06Q 30/0631 |
| | | | | 705/26.7 |
| 2019/0212159 | A1* | 7/2019 | Petersen | G05D 1/0278 |
| 2020/0219393 | A1* | 7/2020 | Adireddy | G08G 1/147 |
| 2020/0265609 | A1* | 8/2020 | Lee | H04N 17/002 |
| 2021/0158430 | A1* | 5/2021 | Buibas | H04B 3/02 |
| 2021/0390812 | A1* | 12/2021 | Chaurasia | G07C 9/27 |
| 2022/0034542 | A1* | 2/2022 | Peters | F24F 11/0001 |

OTHER PUBLICATIONS

Russo, Michele, Roberta Avanzato, and Francesco Beritelli. "PER-COVID (PEople pRoximity based on Certified and coOperative VIDeo-intelligence): A Software Tool for Physical Distancing and PPE Monitoring." 2021 11th IEEE International Conference on Intelligent Data Acquisition and Advanced Computing (Year: 2021).*

Sun, Han, et al. "Collaborative multi-object tracking as an edge service using transfer learning." 2020 IEEE 22nd International Conference on High Performance Computing and Communications; IEEE 18th International Conference on Smart City; IEEE 6th International Conference on Data Science and Systems (Year: 2020).*

Garg, Sahil, et al. "UAV-empowered edge computing environment for cyber-threat detection in smart vehicles." IEEE network 32.3 (2018): 42-51. (Year: 2018).*

* cited by examiner

SYSTEM AND METHOD FOR UTILIZING HEAT MAPS FOR TRAFFIC AND COMPLIANCE REPORTING

CROSS REFERENCE TO RELATED APPLICATIONS

The application claims priority and the benefit of U.S. Provisional Patent Application Ser. No. 63/029,983, entitled "SENSOR SYSTEMS AND METHODS FOR FACILITY OPERATION MANAGEMENT", filed on May 26, 2020, U.S. Utility patent application Ser. No. 17/330,971, entitled "SENSOR SYSTEMS AND METHODS FOR FACILITY OPERATION MANAGEMENT", filed on May 26, 2021, U.S. Provisional Patent Application Ser. No. 63/124,108, entitled "SYSTEM AND METHOD SOCIAL DISTANCING RECOGNITION IN CCTV SURVEILLANCE IMAGERY", filed on Dec. 11, 2020, U.S. Utility patent application Ser. No. 17/548,494, entitled "SYSTEM AND METHOD FOR REAL-TIME MULTI-PERSON THREAT TRACKING AND RE-IDENTIFICATION", filed on Dec. 11, 2021, and U.S. Provisional Patent Application Ser. No. 63/154,836, entitled "SYSTEM AND METHOD FOR UTILIZING HEAT MAPS FOR TRAFFIC AND COMPLIANCE REPORTING", filed on Mar. 1, 2021, these disclosures of which are incorporated herein by reference in their entirety.

BACKGROUND

The embodiments described herein relate to security and video surveillance, in particular, technologies related to video recognition business intelligence.

Facilities such as retail stores, parks, stadiums and municipalities can gain valuable insights from how pedestrians and vehicles move through their spaces. For example, if cars or people often move through a space, it may be a prime location for adverts (advertising), while if cars are parked often in front of a particular store (or people often go into it), one may deduce that particular store is popular. As a further example, if there are long line-ups in front of a restaurant, one may deduce that the food is good.

Furthermore, facilities such as construction sites, hospitals and supermarkets may have strict compliance rules for employees to wear personal protective equipment (PPE). For example, hard hats might be worn on a construction site, or mask usage in a hospital. Currently, compliance is often done by individual spot checks for people who are not compiling. However, these compliance spot checks may be porous, non-uniform and may be problematic in large crowds of people.

For facilities that are equipped with threat detection systems, there is a desire to implement a system and method for better PPE compliance. Furthermore, there is also a desire to understand traffic patterns for further analytics.

SUMMARY

A system and method for utilizing a multi-sensor video surveillance system for traffic and compliance reporting. Utilizing closed caption televisions (CCTVs), cameras and other sensors, the system can generate heat maps and monitor activity in the scene. Based on the heat maps and object detection, the system can monitor traffic patterns for vehicles and monitor people for personal protective equipment (PPE) compliance.

DETAILED DESCRIPTION

Figure 1:
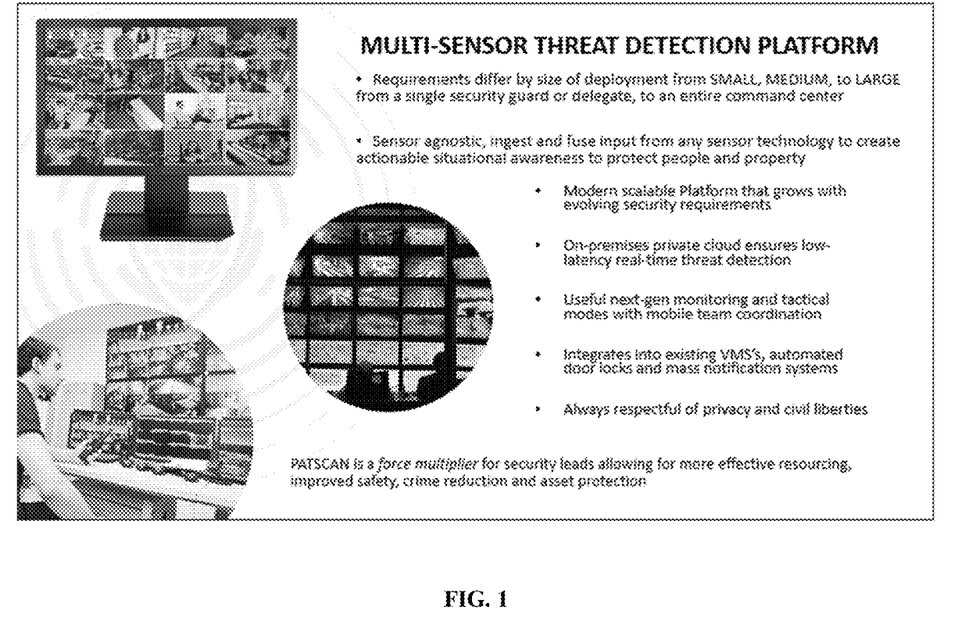
FIG. 1 is a diagram describing the requirements of a multi-sensor video surveillance system.

FIG. 1 is a diagram describing the requirements of a multi-sensor video surveillance system. As seen in FIG. 1, a multi-sensor video surveillance system should have the following requirements, including:

Requirements for different size deployments from small, medium to large from a single security guard or delegate to an entire command center.

Sensor agnostic and ingest and fuse input from any sensor technology to create actionable situational awareness to protect people and property.

Modern scalable platform that grows with evolving security requirements.

On-premises private cloud ensures low-latency real-time threat detection.

Useful next-gen monitoring and tactical modes with mobile team coordination.

Integrates into existing VMSs, automated door locks and mass notification systems.

Always respectful of privacy and civil liberties.

Figure 2:
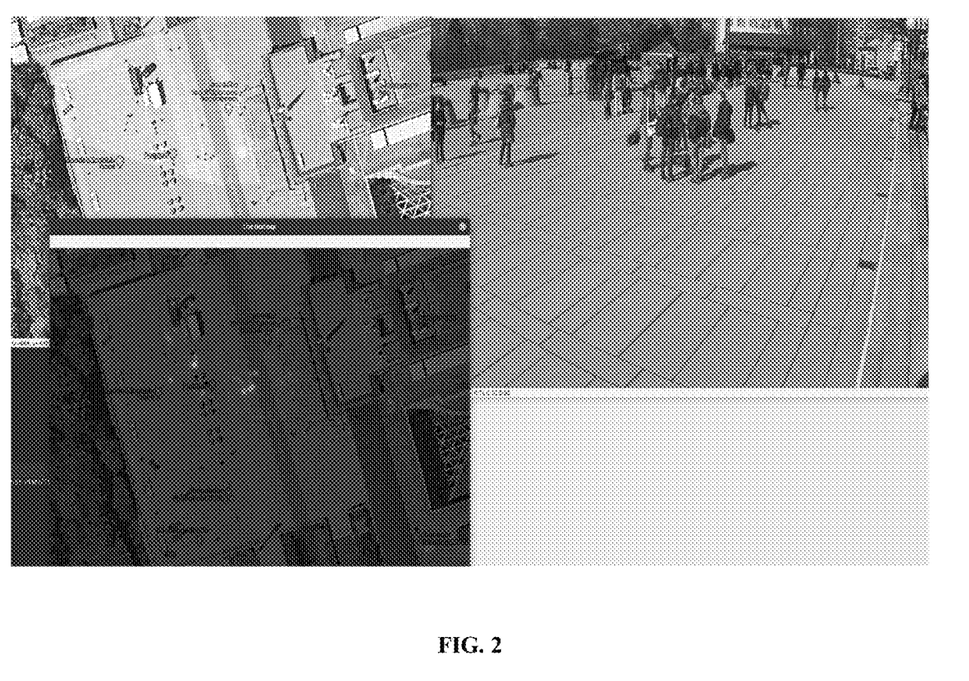
FIG. 2 is a diagram illustrating an exemplary view of a video camera heat map.

FIG. 2 is a diagram illustrating an exemplary view of a video camera heat map. According to FIG. 2, this diagram provides various views. The top and right images show the view of the camera from the satellite view. The bottom image is the "hotspots" on the heat map that are created based on detections.

Using closed-circuit television (CCTV) camera infrastructure, a video surveillance system uses modern algorithms to identify people and/or vehicles in the camera view. It then tracks each individual detection in the space in order to note movement patterns. This movement is then fed to a reporting engine to create maps based on the floor plan of the facility as well as in the camera view. This allows facility owners and others to understand how people move through a location.

Figure 3:
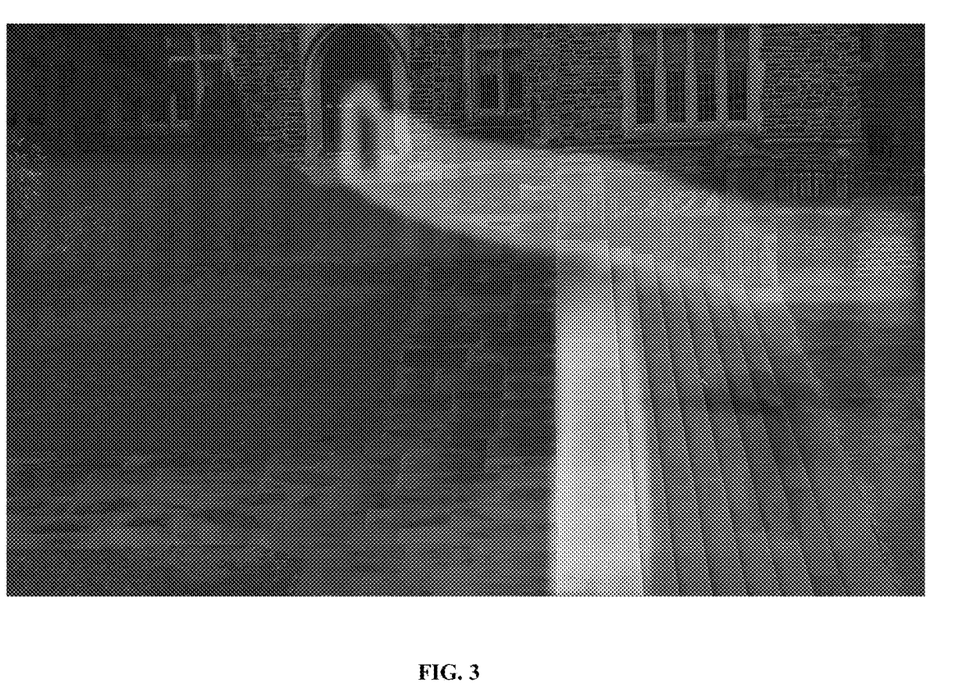
FIG. 3 is a diagram illustrating a heat map applied to a camera view.

FIG. 3 is a diagram illustrating a heat map applied to a camera view. Business intelligence and/or analytics can be gained from FIG. 3 about traffic patterns or whether individuals in the image are complying with PPE requirements (i.e., are PPE worn).

Figure 4A:
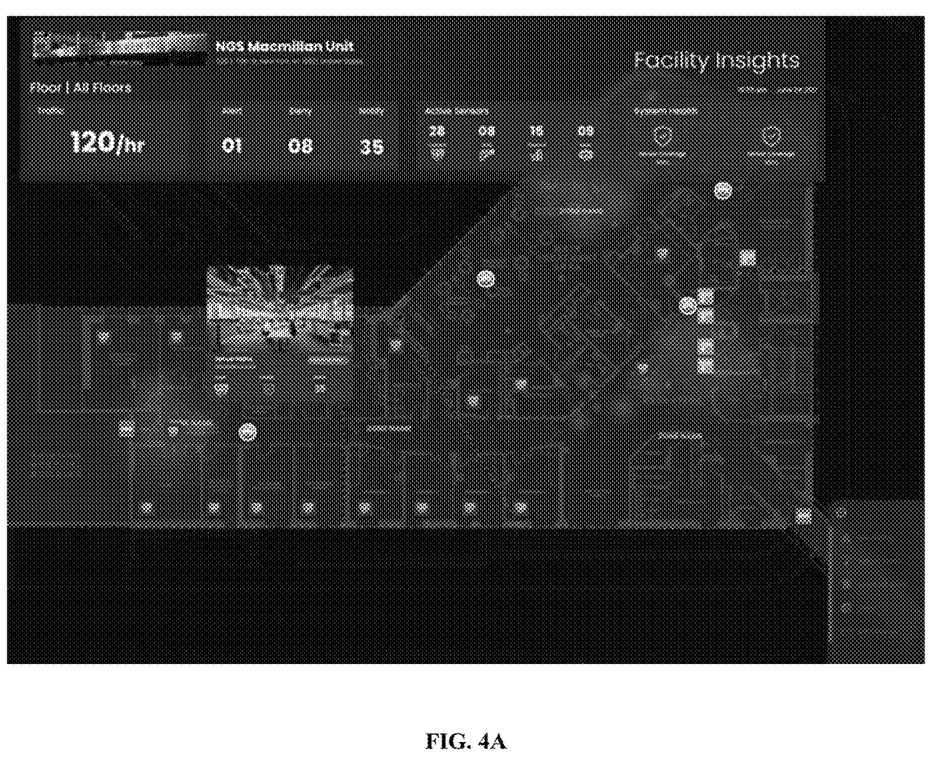
FIGS. 4A to 4C are diagrams illustrating facility insights of a video surveillance system.
Figure 4B:
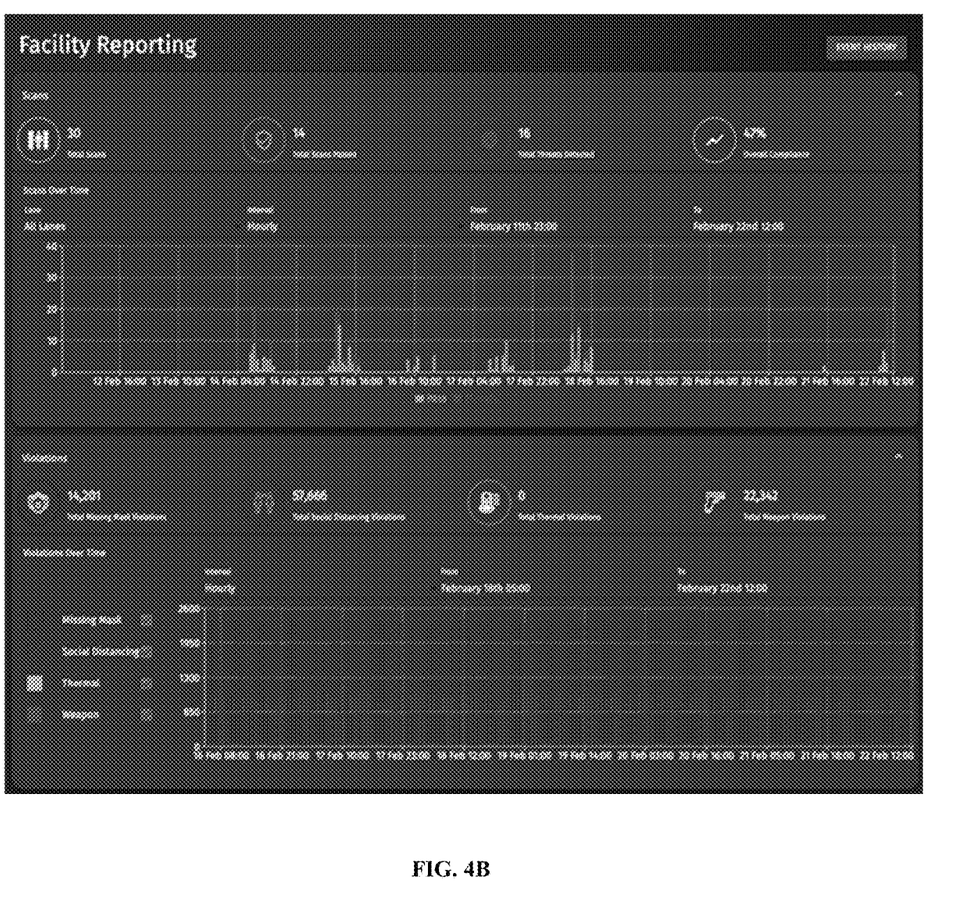
Figure 4C:
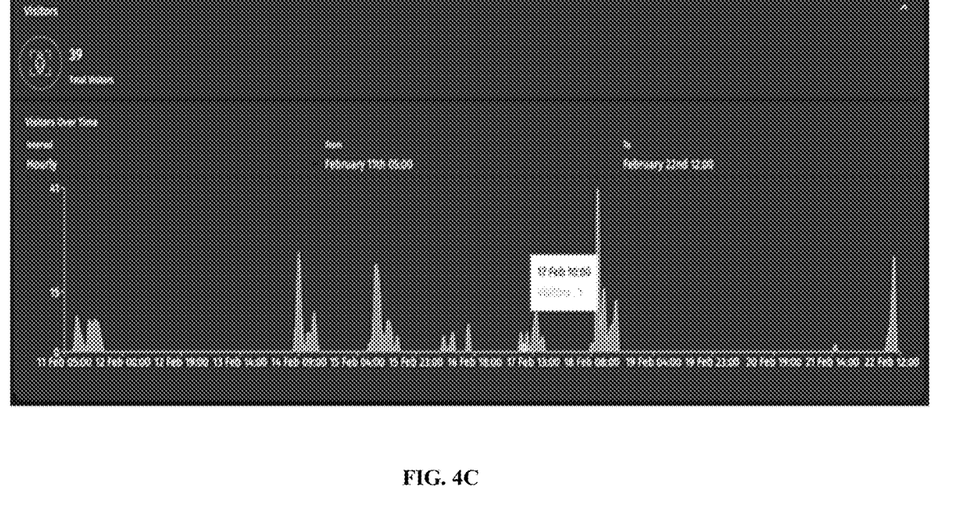

FIGS. 4A to 4C are diagrams illustrating facility insights of a video surveillance system. According to FIG. 4A, an insights dashboard of a facility is shown. Statistics acquired from a multi-sensor video surveillance system can be consolidated into a single dashboard view. Such statistics as traffic speed, the status of alerts (e.g., alert, deny, notify), number of active sensors and types of sensor flags and system health can be shown. FIG. 4B illustrates a facility reporting dashboard showing the total number of scans and violations based on dates. FIG. 4C illustrates a dashboard of visitors based on dates.

Figure 5:
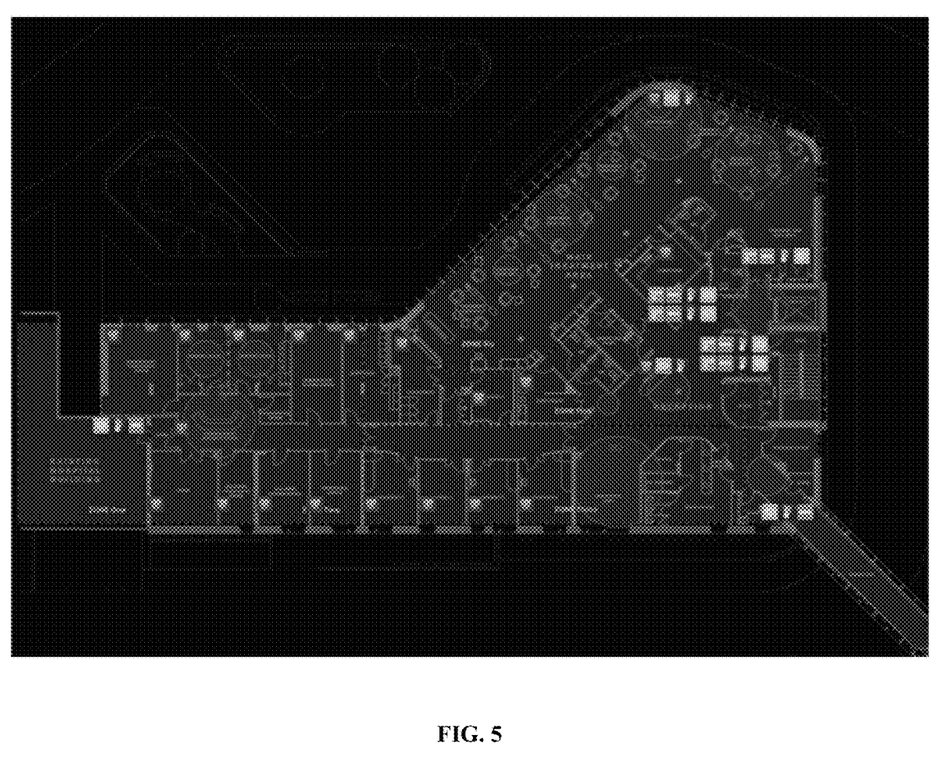
FIG. 5 is a diagram illustrating a heat map representation of a video surveillance system.

FIG. 5 is a diagram illustrating a heat map representation of a video surveillance system. According to FIG. 5, heat map representation using circle representation is shown to represent a heat map view with data points being shown as circles instead of gradients. The size of the circles correlates to the value, the larger the value the larger the circle. The location of the circle corresponds to the sensor location.

Figure 6:
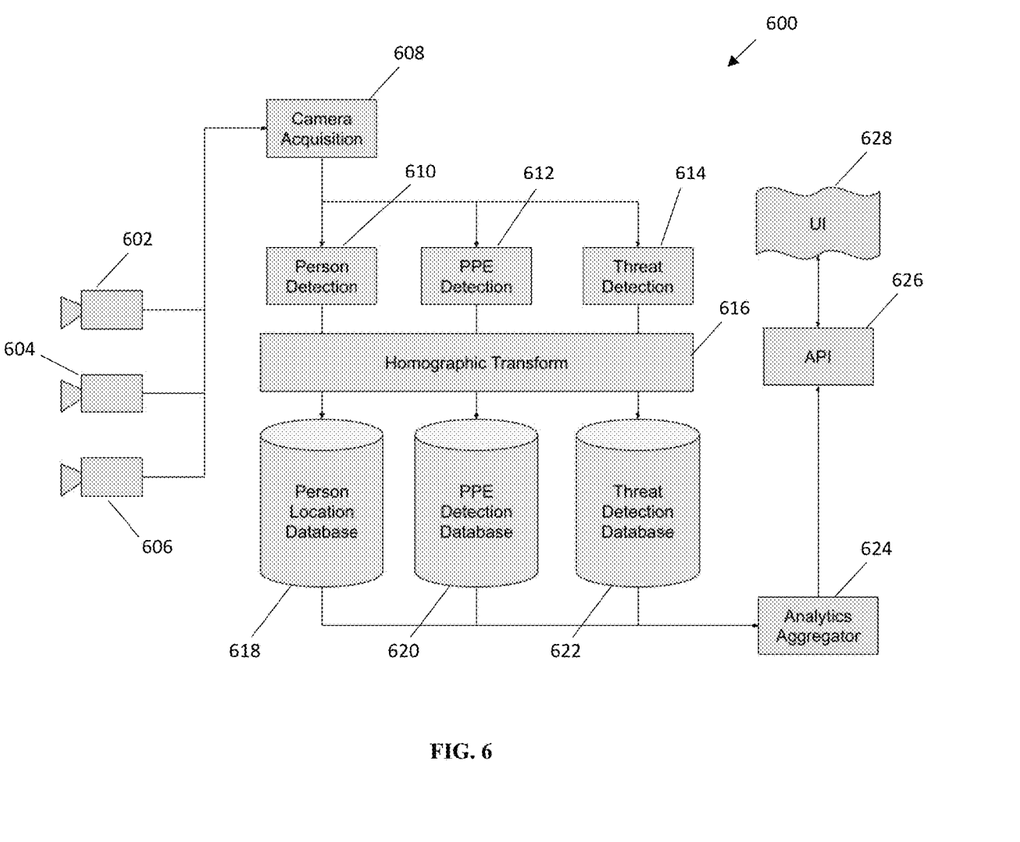
FIG. 6 is a block diagram illustrating an exemplary video surveillance system.

FIG. 6 is a block diagram illustrating an exemplary video surveillance system. According to FIG. 6, system 600 start with cameras, CCTV cameras or sensors 602, 604 and 606. Cameras 602, 604 and 606 enable image acquisition by the camera at 608. A person detection module 610, PPE detection module 612 or threat detection module 610 would identify objects in the images as either people, PPE and/or threats in the images.

According to FIG. 6, once these objects of interest are detected (i.e., people, PPE or threats) it is sent to a homographic transform module (software algorithm) 616 which validates and verifies these values with a person location database 618 hash store, PPE detection database 620 hash store and/or threat detection database 622 hash store.

According to FIG. 6, the information is then sent to an analytics API aggregator module 624, then API module 626 and finally output to one or more user interfaces (UI) 628 for display or notification. User interface 628 may include a computer display, a mobile phone, an email, text message (e.g., SMS) or a voice message and may be delivered to security personnel and/or security center.

The combination of CCTV camera infrastructure, video surveillance system and modern algorithms can be used to identify individuals who are not following compliance regulations. It then notes the location of these violations and uses a reporting engine to create maps based on the floor plan of the facility as well as in the camera view. This allows facility owners to understand where problems occur and implement plans to fix them.

This disclosure reduces human intervention by automating the tracking of policy violations in the facility and allows facility managers to focus on how to fix violations. The threat detection system provides the ability to create useful reports based on actionable information. Furthermore, fusing sensors and applying their output to reporting may provide useful outcomes. Specifying different lengths of time for reports and fusing multiple cameras' information gives a higher cohesiveness to the system.

In further implementations, an exemplary algorithm may be implemented to track vehicles or people for specific patterns. As an example, algorithms may be used to analyze vehicle detection for traffic or tracking people for missing mask detection or social distancing alerts.

According to embodiments of this disclosure, a system for using video surveillance system for traffic and compliance reporting is disclosed. The video surveillance system comprises an image detection means to capture video images, a computer processor to process the video images, a software module to analyze frames of the video images and identify objects, a notification module to send a notification and a user interface to provide a dashboard, visualizing the data from the software module.

According to the disclosure of the system, the user interface monitors traffic patterns for vehicles and monitor people for personal protective equipment (PPE) compliance and the user interface provides heat map visualizations from the video images captured from the image detection means. The image detection means are selected from a list comprising of closed caption televisions (CCTVs), cameras, sensors and the image detection means further comprising a plurality of CCTVs, cameras or sensors to provide coverage of a facility.

According to the disclosure of the system, the user interface provides a dashboard for facility reporting and the dashboard provides data on total scans, traffic reporting and total visitors over duration of date and time. The heat map visualizations are represented by circular heat maps. The software module can detect objects such as vehicles, people and PPE. The notification module includes sending email, text message (SMS), instant message, voice call to a security officer or security center user interface and mobile application.

According to embodiments of this disclosure, a computer-implemented method for using video surveillance system for traffic and compliance reporting is disclosed. The method comprises the steps of receiving an image data from one or more image detection means, analyzing the image frames of the image dataset by a computer processor, identifying objects of interest in the image dataset image frames, analyzing the objects of interest to identify traffic patterns for vehicles and people and providing results of the analysis to a User Interface. The user interface monitors traffic patterns for vehicles and monitors people for personal protective equipment (PPE) compliance and the user interface provides heat map visualizations from the video images captured from the image detection means.

According to the disclosure of the method, the image detection means of the method are selected from a list comprising of closed caption televisions (CCTVs), cameras and sensors. The image detection means further comprising a plurality of CCTVs, cameras or sensors to provide coverage of a facility. The user interface provides a dashboard for facility reporting and the dashboard provides data on total scans, traffic reporting and total visitors over duration of date and time. The heat map visualizations are represented by circular heat maps. The software module can detect objects such as vehicles, people and PPE.

According to the disclosure of the method, the notification module includes sending email, text message (SMS), instant message, voice call to a security officer or security center user interface and mobile application. The method further comprises providing notification of data.

According to embodiments of this disclosure, a computer program product is disclosed. The computer program is encoded on one or more non-transitory computer storage media comprises instructions that when executed by a processor cause the processor to perform the steps of receiving an image data from one or more image detection means, analyzing the image frames of the image dataset by a computer processor, identifying objects of interest in the image dataset image frames, analyzing the objects of interest to identify traffic patterns for vehicles and people, providing results of the analysis to a User Interface.

According to the disclosure of the computer program product, the user interface monitors traffic patterns for vehicles and monitor people for personal protective equipment (PPE) compliance. The user interface provides heat map visualizations from the video images captured from the image detection means. The image detection means are selected from a list comprising of closed caption televisions (CCTVs), cameras and sensors. The image detection means further comprising a plurality of CCTVs, cameras or sensors to provide coverage of a facility.

Implementations disclosed herein provide systems, methods and apparatus for generating or augmenting training data sets for machine learning training. The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A system for using video surveillance system for traffic and compliance reporting comprising:
    an image detection device to capture video images;
    a computer processor to process the video images;
    a software module to analyze frames of the video images and identify objects of interest;
    a plurality of database to store data;
    a notification module to send a notification; and
    a user interface to provide a dashboard, the user interface configured for visualizing the data from the software module;
    wherein the user interface monitors traffic pattern for vehicles and monitor people for personal protective equipment (PPE) compliance;
    wherein the user interface provides heat map visualizations from the video images captured from the image detection device;
    wherein the dashboard is further configured to provide visualization data on total scans, traffic reporting and total visitors over duration of date and time on the user interface;
    wherein the plurality of database is selected from a list consisting of a person location database, a PPE database and a threat detection database;
    wherein the software module further comprises a homographic transform module configured to validate and verify the objects of interest with values of the person location database hash store, PPE detection database hash store or threat detection database hash store.

2. The system of claim 1 wherein the image detection device is selected from a list comprising of closed caption televisions (CCTVs), cameras and sensors.

3. The system of claim 2 wherein the image detection device further comprising a plurality of CCTVs, cameras or sensors to provide coverage of a facility.

4. The system of claim 1 wherein the user interface provides a dashboard for facility reporting.

5. The system of claim 1 wherein the heat map visualizations are represented by circular heat maps.

6. The system of claim 1 wherein the software module can detect objects of interest selected from a list consisting of vehicles, people and Personal Protective Equipment (PPE).

7. The system of claim 1 wherein the notification is selected from a list consisting of sending an email, a text message (SMS), an instant message, and a voice call.

8. The method of claim 7 where the notification is sent to a security officer, a security center user interface or a mobile application.

9. A computer-implemented method for using video surveillance system for traffic and compliance reporting, the method comprising the steps of:
    receiving an image data from one or more image detection device;
    analyzing the image frames of the image dataset by a computer processor;
    identifying objects of interest in the image dataset image frames;
    analyzing the objects of interest to identify traffic patterns for vehicles and people; and
    storing data in one or more databases;

providing results of the analysis to a dashboard user interface, the user interface configured for visualizing data;

wherein the user interface monitors traffic pattern for vehicles and monitor people for personal protective equipment (PPE) compliance;

wherein the user interface provides heat map visualizations from the video images captured from the image detection device;

wherein the dashboard is further configured to provide visualization data on total scans, traffic reporting and total visitors over duration of date and time on the user interface;

wherein the one or databases is selected from a list consisting of a person location database, a PPE database and a threat detection database;

wherein the analyzing the objects of interest step further comprises using a homographic transform module to validate and verify the objects of interest with values of the person location database hash store, PPE detection database hash store or threat detection database hash store.

10. The method of claim 9 wherein the image detection device is selected from a list comprising of closed caption televisions (CCTVs), cameras and sensors.

11. The method of claim 10 wherein the image detection device further comprising plurality of CCTVs, cameras or sensors to provide coverage of a facility.

12. The method of claim 9 wherein the user interface provides dashboard for facility reporting.

13. The method of claim 9 wherein the heat map visualizations are represented by circular heat maps.

14. The method of claim 9 wherein the software module can detect objects of interest selected from a list consisting of vehicles, people and Personal Protective Equipment (PPE).

15. The method of claim 9 wherein the notification module includes sending email, text message (SMS), instant message, voice call to a security officer or security center user interface and mobile application.

16. The method of claim 9 further comprising the step of providing notification of data.

17. A computer program product, encoded on one or more non-transitory computer storage media, comprising instructions that when executed by a processor cause the processor to perform operations comprising:

receiving an image data from one or more image detection device;

analyzing the image frames of the image dataset by a computer processor;

identifying objects of interest in the image dataset image frames;

analyzing the objects of interest to identify traffic patterns for vehicles and people;

storing data in one or more databases;

providing results of the analysis to a dashboard user interface, the user interface configured for visualizing data;

wherein the user interface monitors traffic pattern for vehicles and monitor people for personal protective equipment (PPE) compliance;

wherein the user interface provides heat map visualizations from the video images captured from the image detection device;

wherein the dashboard is further configured to provide visualization data on total scans, traffic reporting and total visitors over duration of date and time on the user interface;

wherein the one or databases is selected from a list consisting of a person location database; a PPE database and a threat detection database;

wherein the analyzing the objects of interest step further comprises using a homographic transform module to validate and verify the objects of interest with values of the person location database hash store, PPE detection database hash store or threat detection database hash store.

18. The program product of claim 17 wherein the image detection device is selected from a list comprising of closed caption televisions (CCTVs), cameras and sensors.

19. The program product of claim 17 wherein the image detection device further comprising plurality of CCTVs, cameras or sensors to provide coverage of a facility.

* * * * *